(12) United States Patent
Friedrich et al.

(10) Patent No.: US 8,790,020 B2
(45) Date of Patent: Jul. 29, 2014

(54) ROLLING BEARING CAGE AND ROLLING BEARING

(75) Inventors: Peter Friedrich, Auernheim (DE);
Michael Krueger, Schweinfurt (DE);
Steffen Saebsch, Weisendorf (DE);
Heinz Schaefers, Erlangen (DE);
Matthias Fick, Schnaittach (DE);
Manfred Winkler, Aurachtal (DE);
Johannes Enders, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 8 days.

(21) Appl. No.: 13/363,450

(22) Filed: Feb. 1, 2012

(65) Prior Publication Data
US 2012/0195541 A1    Aug. 2, 2012

(30) Foreign Application Priority Data
Feb. 1, 2011    (DE) .......................... 10 2011 003 442

(51) Int. Cl.
*F16C 33/46*  (2006.01)
*F16C 33/56*  (2006.01)
*F16C 43/08*  (2006.01)

(52) U.S. Cl.
USPC ........... 384/576; 384/526; 384/579; 384/623; 29/898.064

(58) Field of Classification Search
USPC ......... 384/565, 572, 574, 576, 578, 582, 618, 384/623; 29/898.064, 898.065, 898.067
See application file for complete search history.

(56) References Cited

U.S. PATENT DOCUMENTS

| 2,772,128 | A | * | 11/1956 | Schaeffler et al. | 384/580 |
| 3,382,016 | A | * | 5/1968 | Schmidt | 384/575 |
| 3,500,977 | A | * | 3/1970 | Gehrke | 192/45.015 |
| 3,586,406 | A | * | 6/1971 | Barr | 384/580 |
| 3,863,742 | A | * | 2/1975 | Elmore et al. | 192/45.012 |
| 4,003,609 | A | * | 1/1977 | Juhas | 384/574 |
| 4,054,340 | A | * | 10/1977 | Broshkevitch et al. | 384/576 |
| 4,561,157 | A | * | 12/1985 | Johnson | 29/898.064 |
| 4,613,239 | A | * | 9/1986 | Hofmann et al. | 384/580 |
| 4,961,651 | A | * | 10/1990 | Rabe | 384/51 |
| 5,018,879 | A | * | 5/1991 | Rabe | 384/51 |
| 5,033,876 | A | * | 7/1991 | Kraus | 384/572 |
| 5,033,878 | A | * | 7/1991 | Tsuji et al. | 384/576 |
| 5,352,047 | A | * | 10/1994 | Ingall et al. | 384/572 |
| 5,885,009 | A | * | 3/1999 | Muntnich et al. | 384/576 |
| 6,042,275 | A | * | 3/2000 | Muntnich et al. | 384/580 |
| 7,022,021 | B2 | * | 4/2006 | Perrow | 464/111 |
| 7,210,854 | B2 | * | 5/2007 | Ince et al. | 384/580 |

FOREIGN PATENT DOCUMENTS

DE    1105668 B    4/1961

* cited by examiner

*Primary Examiner* — Marcus Charles
(74) *Attorney, Agent, or Firm* — Simpson & Simpson, PLLC

(57) ABSTRACT

A rolling bearing cage, which has two annular elements and cage crossbars connecting the annular elements to each other so as to form pockets for receiving rolling elements arranged between every two adjacent cage crossbars and the annular elements. The cage crossbars have an elastic configuration. Also, a rolling bearing is disclosed that has a rolling bearing cage.

11 Claims, 2 Drawing Sheets

ROLLING BEARING CAGE AND ROLLING BEARING

CROSS-REFERENCE TO RELATED APPLICATIONS

This application claims priority of DE 10 2011 003 442.0 filed Feb. 1, 2011, which is incorporated by reference herein:

FIELD OF THE INVENTION

The invention relates to a rolling bearing cage comprising two annular elements and cage crossbars connecting the annular elements to each other forming pockets for receiving rolling elements that are arranged between every two adjacent cage crossbars and the annular elements.

BACKGROUND OF THE INVENTION

As well known, rolling bearings are configured with or without a cage. When a cage is used, it assumes, among other things, the function of guiding the rolling bearing elements. The use of a rolling bearing cage can enable the reduction of friction and damping of noises within the bearing. A drawback of using a cage, however, is that a special rolling bearing cage has to be developed and fabricated for each overall size of most of the rolling bearings. It is equally not possible till now to use the same rolling bearing cage for different bearing widths.

German Patent No. 1 105 668 B discloses a prong-type cage that is made of an elastically deformable plastic. However, this prong-type cage cannot be adapted to the length of different rolling elements but is manufactured separately for only one particular length of rolling elements.

SUMMARY OF THE INVENTION

The present invention is directed to a rolling bearing cage that can accommodate rolling elements of different lengths.

The present invention is based on the knowledge that an axially elastic rolling bearing cage can accommodate rolling elements of different lengths.

The present invention therefore relates to a rolling bearing cage comprising two annular elements and cage crossbars connecting the annular elements to each other with pockets for receiving rolling elements configured between every two adjacent cage crossbars and the annular elements. The cage crossbars have an elastic configuration.

In prior art rolling bearing cages, the cage crossbars, which are connecting elements arranged between two annular elements, have a rigid configuration and are therefore suitable only for one particular length of rolling bearing elements. The cage crossbars of the rolling bearing cage of the present invention are elastic and therefore permit the accommodation of rolling bearing elements like, for example, needle rollers or cylindrical rollers of different lengths. This is achieved by the fact that the cage crossbars are extensible, particularly in axial direction.

The invention enables at least a partial reduction of the hitherto usual different varieties of cages that have to be manufactured. A smaller variety of cages of different lengths which, however, comprise rolling elements of the same diameter has the advantage that a reduction of costs in the manufacture of rolling bearings can be attained. A rolling bearing cage according to the invention therefore substantially comprises two annular elements that are firmly connected to each other through elastic cage crossbars so that, through an expansion of the elastic cage crossbars in axial direction, the annular elements can move away from each other and can therefore receive larger rolling bearing elements when more strongly expanded or smaller rolling bearing elements when less strongly expanded.

According to one development of the invention, the elastic cage crossbars are made of an elastic plastics material and are capable of expanding, for instance, by 10% to 20% of their original length without a permanent deterioration of their quality. Suitable plastics are elastomers known to the person skilled in the art such as, for example, network (e.g., vulcanized) caoutchouc or rubber. However, it is also possible to use synthetic caoutchouc made, for instance, out of butadiene or styrene, or even out of natural caoutchouc.

Given the case that a particular rolling bearing is exposed to higher operation-related loading, the rolling bearing cage may also be made of a metallic material with the cage crossbars preferably configured as springs. These springs can then be configured, for instance, in form of coil springs. Through a variation of the geometry of the cage crossbars, for example, through a different spring design or through a variation of the properties of the cage crossbars by using other materials that likewise possess a certain degree of elasticity, the rolling bearing cage according to the invention can further be adapted to meet the particular technical requirements.

Because the elastic cage crossbars in themselves cannot assure a good stable fixing of the axial distance between the two opposing lateral annular elements, according to a further development of the invention, at least three positioning elements are arranged equally spaced over the periphery of the rolling bearing cage between the annular elements.

The positioning elements serve to define the distance between the two annular elements of the rolling bearing cage and to retain these elements at a fixed distance from each other. For this purpose, the positioning elements have a rigid configuration and are preferably rod-shaped.

In such a rolling bearing cage, it is possible to arrange, in alternation, between every two adjacent elastic cage crossbars, a positioning element or a pocket for receiving a rolling element. A rolling bearing cage thus constructed comprises, equally spaced over its periphery, a positioning element followed by a cage crossbar, then a rolling element pocket, then a cage crossbar, then a positioning element and so on.

Whereas the cage crossbars are fixedly connected at their ends to the respective associated annular element, the positioning elements are preferably inserted detachably into the rolling bearing cage. The elastic cage crossbars can be fixed, secure against loss, through gluing, screwing, welding or vulcanization to the two annular elements. As a result, the two annular elements and the elastic cage crossbars together form a composite component which can be kept in stock for the production of rolling bearing cages of different lengths. The axial length of each finished rolling bearing cage is then substantially determined by the length of the positioning elements to be inserted into this composite component.

Further, the present invention relates to a rolling bearing comprising a rolling bearing cage and rolling elements as proposed by the invention. Suitable rolling elements are particularly, needle rollers or cylindrical rollers so that the rolling bearing can be configured, for example, as a needle roller bearing.

In the region of the pockets, on the two opposing annular elements, are preferably arranged rolling element retainers which, by providing only a small contact surface, space the rolling elements from the annular elements and cage crossbars and also guide the rolling elements to thus reduce friction in the bearing.

BRIEF DESCRIPTION OF THE DRAWINGS

The invention will be described further in the following with reference to the following drawings.

DETAILED DESCRIPTION OF THE INVENTION

Figure 1:
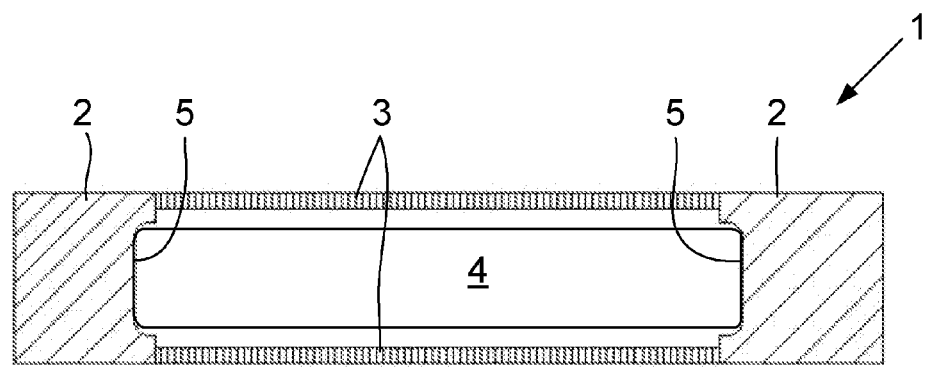
FIG. 1 shows a semi-section I-I taken in axial direction through a rolling bearing cage of FIG. 5, with a top view of a positioning element in which the elastic cage crossbars are in the stretched state.

The rolling bearing cage 1 of a needle roller bearing shown in the figures comprises two axially opposing annular elements 2 that are connected firmly to each other through elastic cage crossbars 3. Between the annular elements 2 are arranged rigid positioning elements 4 which serve to expand the elastic cage crossbars 3 and to retain them in a stretched state as illustrated in FIG. 1. To assure that the positioning elements 4 are retained between the annular elements 2, the annular elements 2 comprise recesses 5 that secure the positioning elements 4 against slipping out of place. In this way, the positioning elements 4 serve to define the spacing of the annular elements 2 from each other and to guarantee this at least till the rolling bearing cage has been filled with rolling elements 7. The positioning elements 4 can be formed by a plurality of thinner needle rollers or small rods.

The material of which the cage crossbars 3 are made must possess the required elasticity for a given fatigue strength. Where appropriate, plastics materials like, for example, rubber or other materials with similar properties known to the person skilled in the art may be used. The geometry of the cage crossbars 3 can manifest different shapes suitable for achieving required cage properties.

Figure 2:
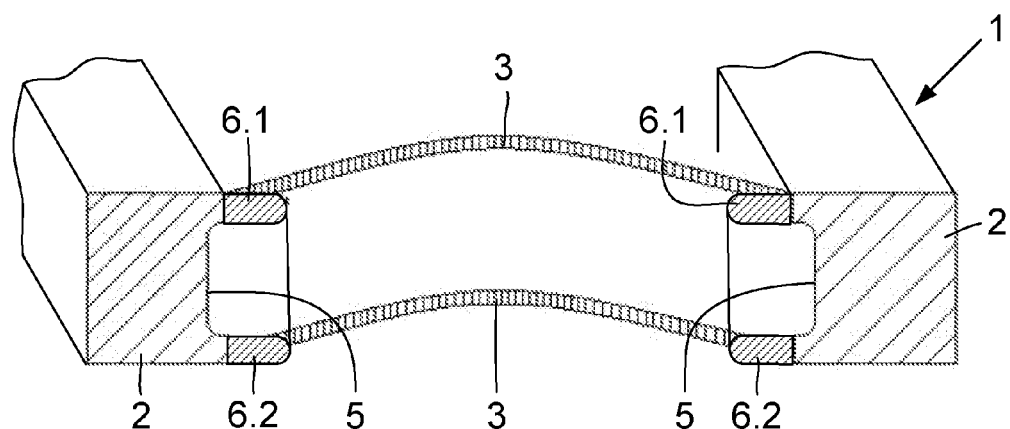
FIG. 2 shows the section represented in FIG. 1, a partial perspective view and without the positioning element, in which the cage crossbars are in the non-loaded state.

FIG. 2 shows the rolling bearing cage 1 already illustrated in FIG. 1, but in a non-loaded state of the cage crossbars 3 and without positioning elements 4. Further, rolling element retainers 6 are configured on the axial inner sides of both the annular elements 2. The upper rolling element retainers 6.1 and the lower rolling element retainers 6.2 serve to position and guide the needle rollers 7 in the rolling bearing cage 1 so that an axial lash of the rolling elements 7 relative to the two annular elements 2 is guaranteed.

Figure 3:
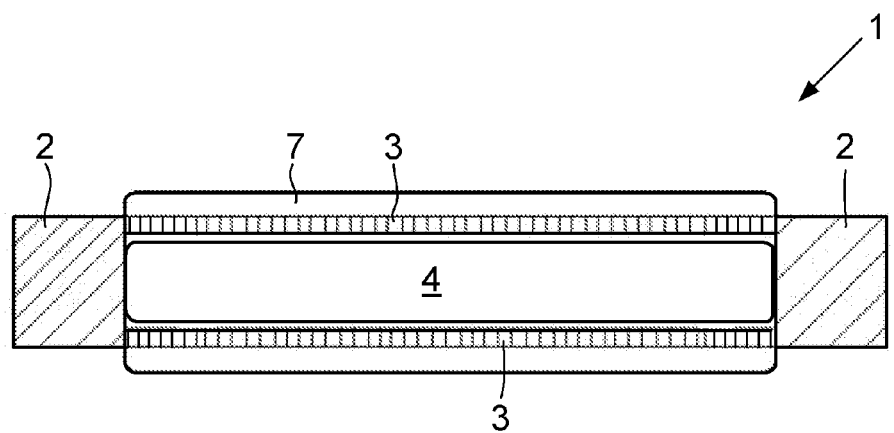
FIG. 3 shows a representation similar to that of FIG. 1 in an axial sectional plane III-III of FIG. 5, with a positioning element and a needle-shaped rolling element filled into a cage pocket.

In FIG. 3, the rolling bearing cage 1 is illustrated equipped with positioning elements 4 and filled with needle-shaped rolling elements 7. The cage crossbars 3 are perceptibly stretched in axial direction. It is easily understandable that, by using axially shorter positioning elements 4, a cage for a needle roller bearing with axially shorter needle-shaped rolling elements can be manufactured in a simple manner. The cage crossbars 3 would then only be slightly less tensioned. In as fax as it is possible to achieve a continuous duty-resistant stretching of the cage crossbars 3 of 10% above their nominal length, the construction proposed by the invention could enable an economical production of two different rolling bearing cages with 100% and with 110% of a given nominal axial length without any problem.

Figure 4:
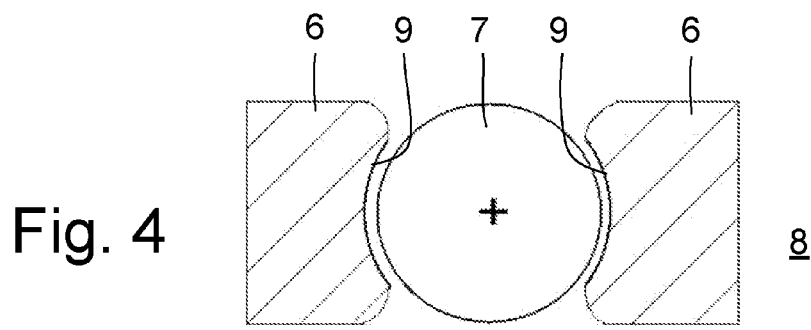
FIG. 4 shows a representation of the rolling element guide of the rolling bearing cage of FIG. 3.

FIG. 4 shows a cross-section through the cage guide 8 that is formed by the rolling element retainers 6. The rolling element retainers 6 are configured with a concave shape on one side 9 so that every two rolling element retainers 6 retain one rolling element 7 in position through their concave sides 9.

Figure 5:
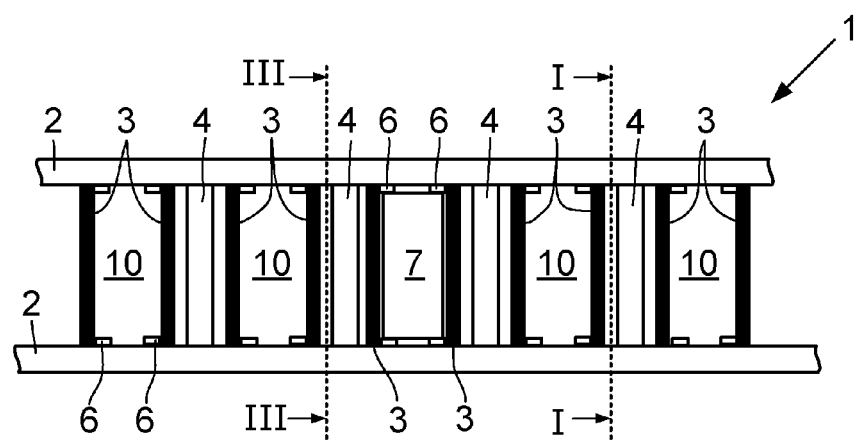
FIG. 5 shows a schematic top view of a rolling bearing cage of the invention comprising positioning elements but not yet completely filled with rolling elements.

Finally, FIG. 5 shows a schematic top view of a rolling bearing cage 1 of the invention equipped with positioning elements 4 but not yet completely filled with rolling elements 7. Thus, this rolling bearing cage 1 is in a state of assembly in which the cage crossbars 3 are already elastically stretched by the positioning elements 4 which space the two annular elements 2 from each other. Only one of the cage pockets 10 is already equipped with a needle-shaped rolling element 7, the other cage pockets 10 are to be filled subsequently.

LIST OF REFERENCE NUMERALS

1. Rolling Bearing Cage
2. Annular Element
3. Cage Crossbar
4. Positioning Element
5. Recess
6. Rolling Element Retainer
6.1 Outer Rolling Element Retainer
6.2 Inner Rolling element Retainer
7. Needle Roller
8. Cage Guide
9. Concave Side of the Rolling Element Retainer 6
10. Pocket

What is claimed:

1. A rolling bearing cage, comprising:
   two annular elements; and
   cage crossbars connecting the annular elements to each other so as to form pockets for rolling elements between every two of the cage crossbars which are adjacent to each other and the annular elements,
   the cage crossbars being elastic such that the cage crossbars are axially expandable from an unexpected nominal state to a stretched state, the rolling bearing cage being configures to retain the rolling between the two annular elements in the stretch state of the crossbars, and wherein the cage crossbars are coil springs.

2. The rolling bearing cage according to claim 1, wherein the cage crossbars are made of plastic material.

3. The rolling bearing cage according to claim 1, further comprising at least three positioning elements arranged equally spaced over a periphery of the rolling bearing cage between the annular elements the at least three position elements holding the annular elements apart to achieve a continuous duty stretching of the cage crossbars.

4. The rolling bearing cage according to claim 3, wherein one of the positioning elements is arranged between two of the cage crossbars which are adjacent to each other, or a pocket formed between two of the cage crossbars which are adjacent to each other.

5. The rolling bearing cage according to cam 4, wherein the positioning elements have a rigid rod-shaped configuration.

6. The rolling bearing cage according to claim 1, wherein the cage crossbars and the annular elements are connected firmly to one another.

7. A rolling bearing comprising:
   a rolling bearing cage having two annular elements, and cage crossbars connecting the annular elements to each other so as to form pockets between every two of the cage crossbars which are adjacent to each other and the annular elements, the cage crossbars being elastic such that the cage crossbars are axially expandable from an unexpanded nominal state to a stretched state, the rolling bearing cage; and rolling elements arranged in the pockets of the rolling bearing cage, the rolling elements being held between the annular elements in the stretched state of the cage, and wherein the cage crossbars are coil springs.

8. The rolling bearing according to claim 7, wherein the rolling bearing is a needle roller bearing.

9. The rolling bearing according to claim 7, further comprising rolling element retainers arranged on opposing axial inner sides of the annular elements in a region of the pockets.

10. The rolling bearing cage according to claim 1, wherein the cage crossbars are axially expandable by at least 10% of an unexpanded length without permanent deterioration.

11. The rolling bearing according to claim 7, wherein the cage crossbars are axially expandable by at least 10% of an unexpanded length without permanent deterioration.

* * * * *